United States Patent
Hu et al.

(10) Patent No.: US 10,924,053 B2
(45) Date of Patent: Feb. 16, 2021

(54) METHOD FOR REMOTE SUPPORT OF ELECTRIC DRIVE APPARATUS

(71) Applicant: ABB Schweiz AG, Baden (CH)

(72) Inventors: Zhongliang Hu, Espoo (FI); Pasi Koivumäki, Espoo (FI); Mikko Korpinen, Vantaa (FI)

(73) Assignee: ABB Schweiz AG, Baden (CH)

( * ) Notice: Subject to any disclaimer, the term of this patent is extended or adjusted under 35 U.S.C. 154(b) by 220 days.

(21) Appl. No.: 15/938,949

(22) Filed: Mar. 28, 2018

(65) Prior Publication Data

US 2019/0305712 A1    Oct. 3, 2019

(51) Int. Cl.
| | |
|---|---|
| *G06F 3/14* | (2006.01) |
| *H02P 29/00* | (2016.01) |
| *H02P 27/06* | (2006.01) |
| *H04L 29/08* | (2006.01) |

(52) U.S. Cl.
CPC ............ *H02P 29/00* (2013.01); *G06F 3/1454* (2013.01); *H04L 67/02* (2013.01); *H04L 67/025* (2013.01); *H04L 67/125* (2013.01); *H04L 67/141* (2013.01); *H04L 67/34* (2013.01); *H02P 27/06* (2013.01)

(58) Field of Classification Search
CPC ... H04L 41/0806; H04L 67/02; H04L 67/025; H04L 67/125; H04L 67/141; H04L 67/34; G06F 3/04847; G06F 3/1454; H02P 29/00; H02P 27/06
USPC ........................................................ 700/275
See application file for complete search history.

(56) References Cited

U.S. PATENT DOCUMENTS

| | | | |
|---|---|---|---|
| 2015/0087288 A1* | 3/2015 | Dharawat | H04W 4/70 455/419 |
| 2015/0244814 A1* | 8/2015 | Khalatian | H04L 67/141 715/753 |
| 2015/0287318 A1* | 10/2015 | Nair | G08C 17/02 340/5.52 |
| 2016/0173816 A1 | 6/2016 | Huenerfauth et al. | |

FOREIGN PATENT DOCUMENTS

EP    2927854 A1    10/2015

OTHER PUBLICATIONS

European Patent Office, Extended Search Report issued in corresponding Application No. 19165442.5, dated Jun. 12, 2019, 11 pp.

* cited by examiner

*Primary Examiner* — Michael J Brown
(74) *Attorney, Agent, or Firm* — Taft Stettinius & Hollister LLP

(57) ABSTRACT

The invention relates to electric drive apparatuses used in different industries for different applications more particularly to a method for remote support of an electric drive apparatus. The method comprises: starting in a first apparatus a remote support tool application, said first apparatus having a connection with an at least one electric drive apparatus in a local site, forwarding by said first apparatus an indication of a configuration parameter data user interface of said first apparatus to a third apparatus in a remote site, and receiving by said first apparatus from said third apparatus at least one tagged version of a screen of the configuration parameter data user interface of said first apparatus.

26 Claims, 8 Drawing Sheets

METHOD FOR REMOTE SUPPORT OF ELECTRIC DRIVE APPARATUS

FIELD OF THE INVENTION

The invention relates to electric drive apparatuses used in different industries for different applications more particularly to a method for remote support of an electric drive apparatus.

BACKGROUND OF THE INVENTION

Electric drives are used in industry for different applications, such as for driving motors within the transportation industry, for driving different devices within the process and manufacturing industry as well as within the energy industry. There are applications commonly used for electric drives within the transportation industry for example in metro and railway traffic applications as well as in ship propulsion unit applications of the marine industry. Within the process and manufacturing industry, electric drives can be used for example in conveyer applications, in mixer applications or even in paper machine applications. Within the energy industry, electric drives can be used for example as electric drives for wind turbines of the wind power industry and as electric drives of the solar power industry.

Electric drives for electric motors may be divided into DC motor drives (DC, direct current) and AC drives (AC, alternating current). In a DC motor of a DC motor drive, a magnetic field is generated by the current through the field winding in the stator. This magnetic field is always maintained at right angles to the field generated by the armature winding. In this way, a DC motor's torque is generated, which torque can then be easily controlled in a DC motor drive by changing the armature current and keeping the magnetizing current constant. In a DC motor drive, also the DC motor speed can be controlled directly through armature current.

Within electric drives, the AC drives may further be divided into frequency-controlled AC drives, flux-vector-controlled AC drives and into AC drives utilising direct torque control (DTC, Direct Torque Control). In flux-vector-controlled AC drives and in direct torque control AC drives the torque of the three-phase motor can be controlled, whereas in frequency controlled AC drives the load dictates the torque level.

In the following, prior art will be described with reference to the accompanying FIG. 1, which shows a block diagram of an electric drive according to prior art.

FIG. 1 shows a block diagram of an electric drive according to prior art. The electric drive according to prior art comprises an input power feed 1, a frequency controller 2 and a load 3. The load 3 can be for example a motor 3. The frequency controller 2 typically comprises a rectifier unit 4, a fixed DC voltage intermediate circuit 5 and an inverter unit 6. The rectifier unit 4 of the frequency controller 2 converts the AC input power coming from the input power feed 1 into DC intermediate power. The rectifying in the frequency controller 2 can be realised for example with a 6-pulse diode bridge. The DC intermediate power coming from the rectifier unit 4 of the frequency controller 2 is stored in the fixed DC voltage intermediate circuit 5 acting as intermediate energy storage. The fixed DC voltage intermediate circuit 5 of the frequency controller 2 can be realised for example with capacitors. The inverter unit 6 of the frequency controller 2 converts the DC power of the fixed DC voltage intermediate circuit 5 into three channels of AC energy at the frequency suited by the motor 3 acting as a load 3. The inverter unit 6 of the frequency controller 2 can be realised for example with IGBT-type transistors (IGBT, Insulated-gate bipolar transistor).

Electric drives are typically used in very demanding applications. Especially, in most of the applications used, the demand for a most optimal and reliable operation and for operational efficiency constantly increasing. The operation of an electric drive apparatus depends upon the most optimal configuration and upon the most optimal electric drive parameter set up. When electric drives are used in an application to drive the load, e.g. a motor, optimally, energy will be saved considerably. On the other hand, when electric drives are not used correctly or are not having the most optimal configuration in an application, energy savings will not be that great.

In a typical electric drive application, there are several subsystems in the electric drive apparatus and in the application setting that may all contribute to reliable operation and to the overall operational efficiency of the electric drive application. For example in FIG. 1, the functioning of the rectifier unit 4, the fixed DC voltage intermediate circuit 5 and the inverter unit 6 as subsystems 4 to 6 of the frequency controller 2 as well as the functioning of the input power feed 1 and the load 3 may all contribute to reliable operation and to the overall operational efficiency of the particular electric drive application. Each one of said several subsystems in the electric drive apparatus may have several drive parameters that need to be correctly configured for most optimal configuration in any given situation.

The evolvement of communication technology, particularly wireless communication technology and end user devices, has enabled versatile communication possibilities and introduction of different services. An example of such a service is a remote support for maintenance staff of machines and equipment. There are smartphone applications that allow a user of the smartphone to receive service recommendations for a machine, store operational data on the machine over the network connection, and troubleshoot the machine.

Since the amount of data to be transmitted over a network connection between a smartphone and the service center may be rather big, in order to the application function properly, a network connection with high data throughput is needed. Such a network connection is not necessarily available at an industrial site because of shadow regions causing the smart phone to downgrade to use network technology with a lower data rate or because the industrial site locates in an area not yet having a wireless network with high enough data rate.

However, due to the lack of bandwidth of mobile network especially in remote locations, it is often not possible to reach a reasonable screen sharing experience to a reasonable user experience level. This means, the local user will likely to experience lagging or a connection break since all the pixel information from the mobile needs to be transferred over the network connection.

BRIEF DESCRIPTION OF THE INVENTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, apparatuses, a system and a computer program product for providing a conversion of a configuration parameter setting originating from an electric drive apparatus to a converted configuration parameter setting compatible with a new electric drive apparatus.

BRIEF DESCRIPTION OF THE DRAWINGS

In the following, the present invention will be described in greater detail by way of example and with reference to the accompanying drawings, in which.

Figure 1:
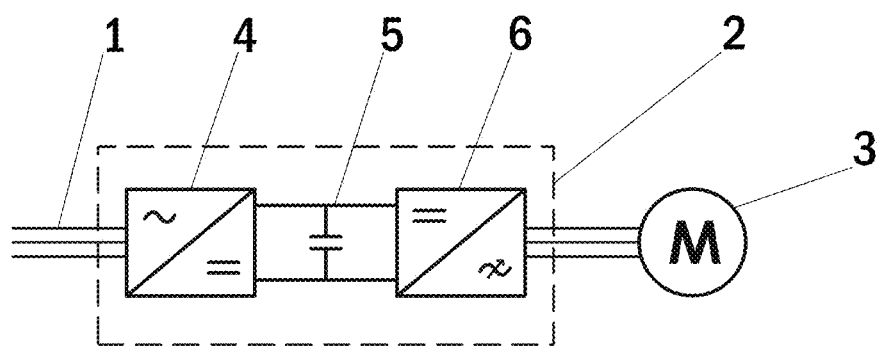
FIG. 1 shows a block diagram of an electric drive according to prior art.

Prior art drawing of FIG. 1 has been presented earlier. In the following, the invention will be described in greater detail by means of preferred embodiments with reference to the accompanying drawings of FIGS. 2 to 10. The foregoing aspects, features and advantages of the invention will be apparent from the drawings and the detailed description related thereto.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any piece of a system and the system that comprises one or more service centers or service desk equipment configurable to transmit instructions and recommendations to a remote user apparatus. In the following, maintenance is used as an example of a remote service without restricting the examples to the maintenance.

Figure 2:
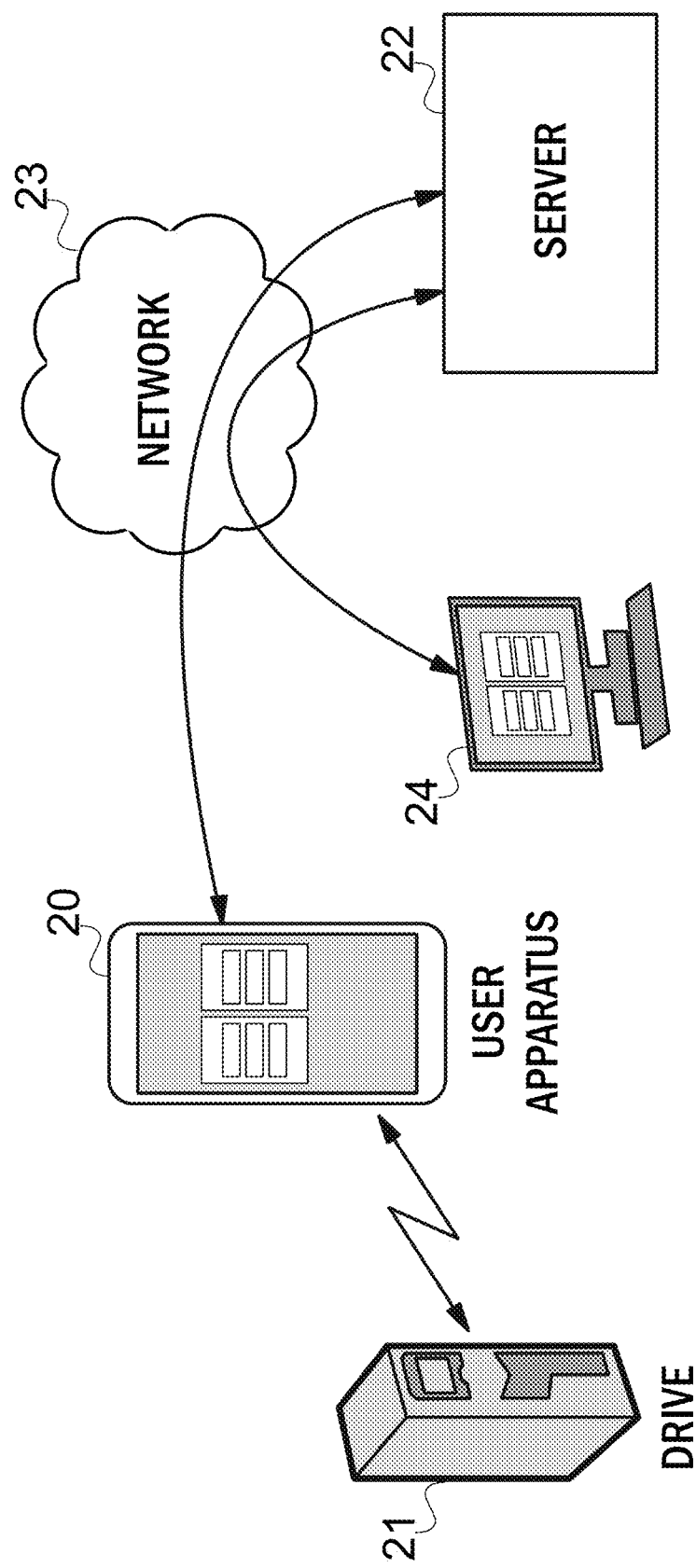
FIG. 2 illustrates a simplified architecture of an arrangement for remote support of an electric drive apparatus system and some apparatuses according to an exemplary embodiment of the present invention.

FIG. 2 illustrates a simplified architecture of an arrangement for remote support of an electric drive apparatus system and some apparatuses according to an exemplary embodiment of the present invention. FIG. 2 is a simplified system architecture only showing some elements, functional entities, which are logical units whose implementation may differ from what is shown, and some equipment. It is apparent to a person skilled in the art that the system may comprise any number of shown elements, other equipment, other functions and structures that are not illustrated.

In the embodiment illustrated in FIG. 2, the electric drive apparatus system comprises a user apparatus 20 of a remote user as visiting equipment and one or more electric drives 21 (only one illustrated in FIG. 2) as permanent equipments. The permanent equipment means herein equipment that is intended to locate in the industrial site a long time, whereas the visiting equipment means equipment that is intended to visit the industrial site temporarily. However, it should be appreciated that the user apparatus 20 may be permanent equipment as well.

In the embodiment illustrated in FIG. 2, the electric drive apparatus system also comprises one or more server 22 (only one illustrated in FIG. 2) and one or more service desk 24 (only one illustrated in FIG. 2). Said one or more service desk 24 is configured to provide remote support for said one or more electric drives 21.

In the electric drive apparatus system according to the presented embodiment, said user apparatus 20 is configured to communicate with said one or more electric drives 21, e.g. via a Bluetooth® connection. Said user apparatus 20 is also connected over one or more networks 23 (only one illustrated in FIG. 2) to said one or more server 22. In the electric drive apparatus system according to the presented embodiment, said one or more service desk 24 is connected to said one or more server 22, either directly or over one or more networks 23. Said one or more service desk 24 is also connected to said user apparatus 20, either directly over one or more networks 23 or via said one or more server 22.

In the embodiment illustrated in FIG. 2, the electric drive apparatus system in an industrial site comprises one or more installed electric drives 21. It should be appreciated that an electric drive 21 depicts herein any device, machine, equipment, system and a process that whose operations and/or service and/or maintenance may be taken care remotely. Other examples of such equipment include frequency converters, AC/DC modules, DC/AC modules, programmable logic controllers, switches, motion controllers or motion drives, servo motors, soft starters, robots, cars, and heavy equipment, etc. It should be appreciated that in the above only some examples are listed.

In a typical of electric drive apparatus setup the control software of the electric drive is usually executed on the specific central processing unit (CPU) which control software is typically embedded very closely to drive hardware. Control software has multiple tasks to control the drive based on physical inputs and outputs.

The electric drive apparatus system according to the presented exemplary embodiment also comprises a user apparatus 20. The user apparatus 20 refers to a computing device (equipment), that may be a non-portable device or a portable device (mobile device), and it may also be referred to as a user terminal or user device. Portable computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer), multimedia device, wearable computer and other types of wearable devices, such as clothing and accessories incorporating computer and advanced electronic technologies. The user apparatus 20 is configured to support controlling and/or parameter configuration of an electric drive apparatus with the help of an electric drive apparatus remote support tool, e.g. a user application such as a mobile application (app), a tablet application or a desktop application.

In the illustrated example, the user apparatus 20 has at least two communications interfaces, one to connect to said one or more server 22 or to said one or more service desk 24 wirelessly over one or more networks 23 and one to connect to said one or more installed electric drives 21 over a local connection. The wireless connection to the service center may be provided by any mobile system, such as GSM, GPRS, LTE, 4G, 5 G and beyond, or a combination of a mobile system and a fixed system, like Wi-Fi or Li-Fi providing access to internet and via internet to the service center. The local connection may be provided naturally over a mobile system but it may be provided by a direct connection, for example using Bluetooth®, or by a local network, like Wi-Fi or Li-Fi. The number of reception and/or transmission antennas (not illustrated in FIG. 2), or other communication interfaces, of said user apparatus 20 may naturally vary according to a current implementation, and the user apparatus type.

The one or more networks 23 (communications networks) may comprise one or more wireless networks, wherein a wireless network may be based on any mobile system, such as GSM, GPRS, LTE, 4G, 5 G and beyond, or a wireless local area network, such as Wi-Fi, Li-Fi. Further, the one or more networks 23 may comprise one or more fixed networks and internet.

In the illustrated example the server 22, like a cloud server or a grid server, refers herein to a combination of a data storage and a data management system. The data storage may be any kind of conventional or future data repository, including distributed and centralized storing of data, a cloud-based storage in a cloud environment, managed by any suitable management system. The implementation of the data storage, the manner how data is stored, retrieved and updated are irrelevant to the invention, and therefore not described in detail here. The server 22 comprises a connection over the one or more networks 23 to said user apparatus 20, and a connection either directly or over the one or more networks 23 to said service desk 24.

The server 22 is configured to receive from said user apparatus 20 an indication of a configuration parameter data user interface of said user apparatus 20. Said configuration parameter data user interface of said user apparatus 20 can e.g. be a user interface of a mobile application in a user apparatus 20, said user apparatus 20 being a mobile device. The server 22 is also configured to share calculated value data for user interfaces of said user apparatus 20 and of said service desk 24.

The server 22 is configured to provide a tagged version of each of the screen of the configuration parameter data user interface and share i.e. mirror said each of the screen of the configuration parameter data user interface with said tagged version of the local UI (UI, user interface), i.e. remote UI. This can be done, for example, by utilizing a web page that resembles the screen display of the application of the user apparatus 20, e.g. the mobile screen. Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

Since the local UI and remote UI are mirror by tag and parameter value, the data transfer needed between the mobile application and the server is only the page tag and parameter values, which is much smaller data amount than each and every pixel of the screen.

In the illustrated example, service desk 24 may be any combination of any user interface, like touch screen or combination of a display and a keypad, and any computing apparatus. Examples of such apparatuses include a work station, a laptop computer, a personal computer, a wearable computer and a display connected to the server 22. The service desk 24 is configured to provide remote support.

Figure 3:
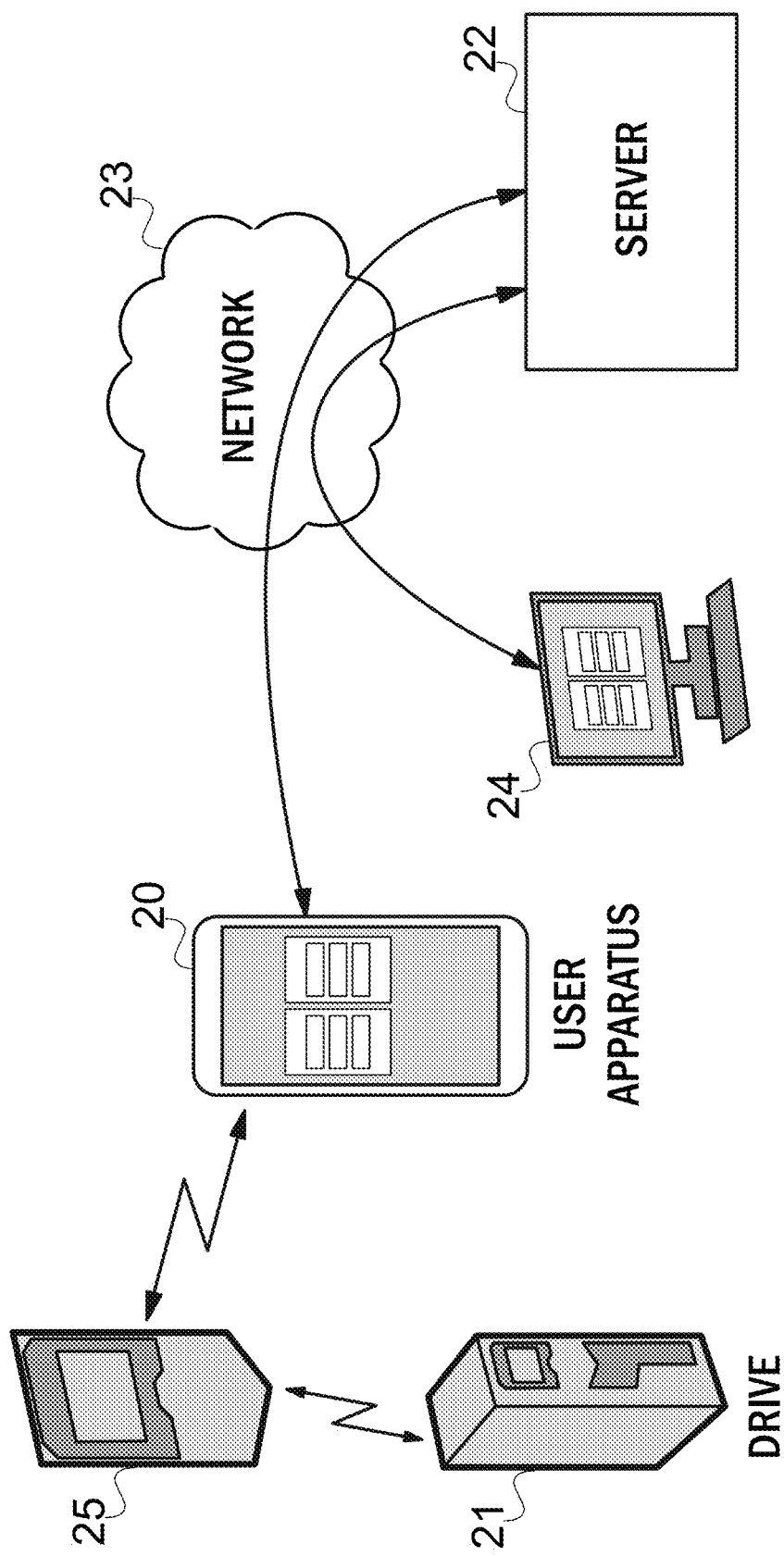
FIG. 3 illustrates a simplified architecture of an arrangement for remote support of an electric drive apparatus system and some apparatuses according to another exemplary embodiment of the present invention.

FIG. 3 illustrates a simplified architecture of an arrangement for remote support of an electric drive apparatus system and some apparatuses according to another exemplary embodiment of the present invention. In the embodiment illustrated in FIG. 3, the electric drive apparatus system comprises a user apparatus 20 of a remote user as visiting equipment and one or more electric drives 21 as permanent equipments. The electric drive apparatus system also comprises one or more server 22 and one or more service desk 24, said one or more service desk 24 being configured to provide remote support for said one or more electric drives 21.

The electric drive apparatus system also comprises an at least one drive controller 25 configured to control one or more electric drives 21. In the electric drive apparatus system according to the presented embodiment, said user apparatus 20 is configured to communicate with said at least one drive controller 25, e.g. via a Bluetooth® connection. Said at least one drive controller 25 configured to communicate with said one or more electric drive 21, e.g. via a serial connection, such as an RS-485 connection, or via a Bluetooth® connection.

Said user apparatus 20 is also connected over one or more networks 23 (only one illustrated in FIG. 3) to said one or more server 22. The user apparatus 20 is configured to support controlling and/or parameter configuration of an electric drive apparatus with the help of an electric drive apparatus remote support tool, e.g. a user application such as a mobile application (app), a tablet application or a desktop application. In the electric drive apparatus system according to the presented embodiment, said one or more service desk 24 is connected to said one or more server 22, either directly or over one or more networks 23. Said one or more service desk 24 may also be connected to said user apparatus 20, either directly over one or more networks 23 or via said one or more server 22.

The server 22 is configured to receive from said user apparatus 20 an indication of a configuration parameter data user interface of said user apparatus 20. The server 22 is also configured to share calculated value data for user interfaces of said user apparatus 20 and of said service desk 24. The server 22 is configured to provide a tagged version of each of the screen of the mobile application and mirror that with a "remote version" of local UI (UI, user interface), i.e. remote UI. This can be done, for example, by utilizing a web page that resembles the screen display of the application of the user apparatus 20, e.g. the mobile screen. Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

Figure 4:
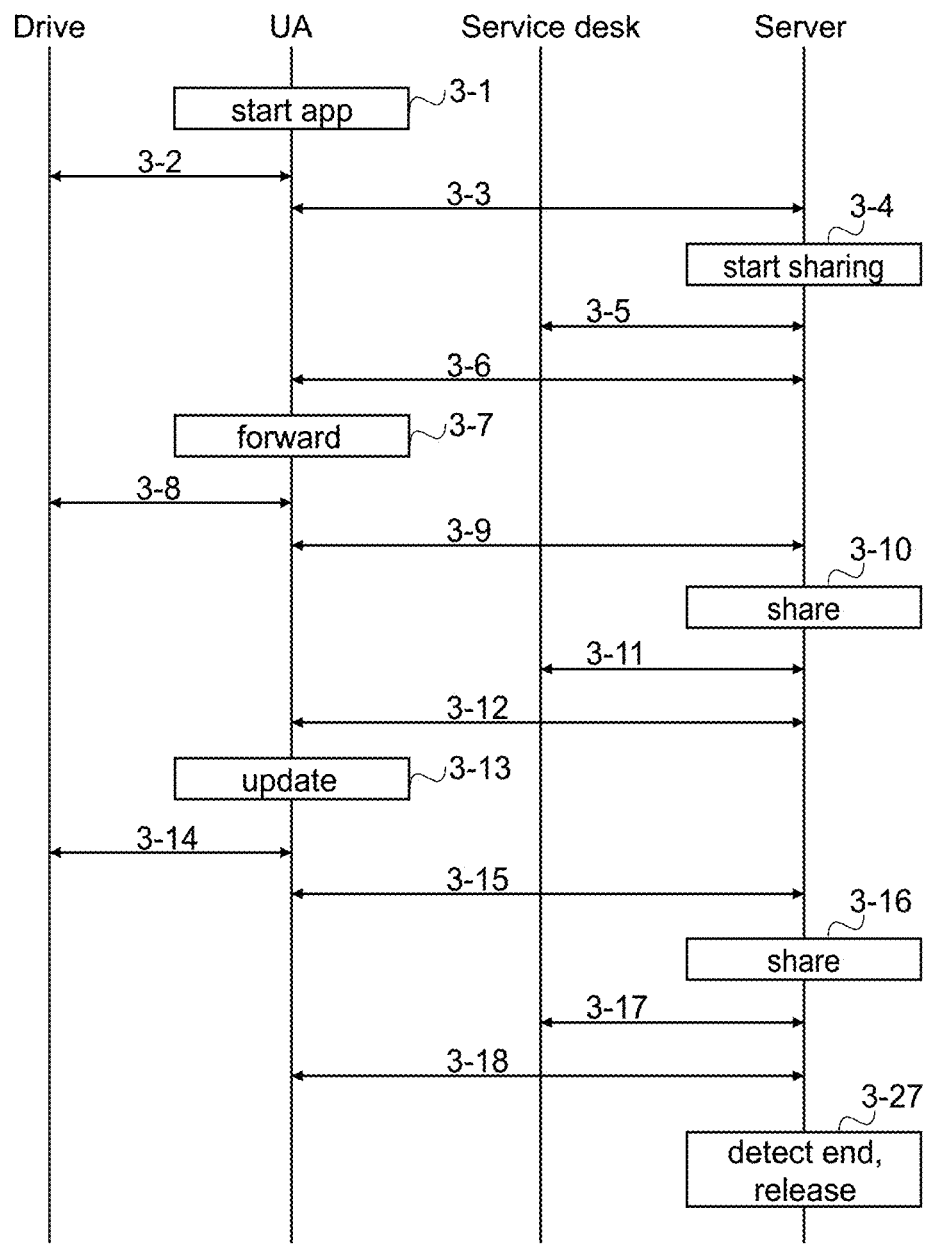
FIG. 4 illustrates exemplary information exchange according to an exemplary embodiment of the present invention.

FIG. 4 illustrates exemplary information exchange according to an exemplary embodiment of the present invention. FIG. 4 illustrates information exchange in an exemplary situation in which a remote support tool application is utilized for controlling and/or parameter configuration of an electric drive apparatus for example. Further, in the illustrated example it is assumed that alerting is triggered by sending a corresponding message and the alerting is continued as long as a message stopping alerting is received. However, it is a straightforward solution to implement the functionality disclosed below to a solution in which alerting is continued as long as alerting messages are received (and naturally sent) at a certain intervals. It should be appreciated that any known or future communication protocol and process to establish a session/connection may be used. Therefore, they are not described in detail herein.

Referring to FIG. 4, when the user starts (point 3-1) an electric drive apparatus remote support tool, e.g. a user application such as a mobile application (app), a tablet application or a desktop application, in a user apparatus 20, UA, a local connection to an electric drive 21 is established; the messages 3-2 illustrate the session establishment and information exchange between them.

After the session establishment is completed, the user apparatus 20 initiates in point 3-3, the establishing a connection to a server 22. The user apparatus 20 establishes a session to a server 22 and forwards in point 3-3 an indication of a configuration parameter data user interface of said user apparatus 20.

Referring to FIG. 4, the server 22 receives in point 3-3 from the user apparatus 20 the indication of a configuration parameter data user interface of said user apparatus 20 and initiates a session 3-4 for starting sharing said configuration parameter data user interface of said user apparatus 20. Said configuration parameter data user interface of said user apparatus 20 can e.g. be a user interface of a mobile application in a user apparatus 20, said user apparatus 20 being a mobile device. The server 22 provides a tagged version of each of the screen of the configuration parameter data user interface and shares i.e. mirrors said each of the screen of the configuration parameter data user interface with said tagged version of the local UI (UI, user interface), i.e. remote UI. The server 22 may do this, for example, by utilizing a web page that resembles the screen display of the application of the user apparatus 20, e.g. the mobile screen. Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

Thereafter, the server 22 establishes a screen sharing session to a service desk 24 in point 3-5. Likewise, the server 22 establishes a screen sharing session to said user apparatus 20 in point 3-6. The server 22 shares in said screen sharing sessions the configuration parameter data user interface of said user apparatus 20 to be displayed by the user interfaces of said user apparatus 20 (point 3-5) and with said service desk 24 (point 3-6).

After the screen sharing session has been established, the user apparatus 20 detects the completion of the screen sharing session establishment and initiates a session 3-7 for forwarding configuration parameter setting of the electric drive. Thereafter, unlike in prior art solution, the user apparatus 20 (i.e. the electric drive apparatus remote support tool application in said user apparatus 20) downloads a configuration parameter setting of said electric drive 21 to the user apparatus 20; the messages 3-8 illustrate the download session establishment and information exchange and download between them. The configuration parameter setting includes, but is not limited to, the drive parameter settings, process parameter settings, and other relevant process information downloaded from the electric drive 21.

The downloaded parameter settings may include parameters including but being not limited to: electric drive model parameters, drive component version parameters, functional drive parameters (including drive motor rating parameters), physical drive parameters, drive test parameters (including drive motor ID run result parameters), user generated parameters, drive application generated parameters, drive accessory parameters, drive optional module/hardware parameters (including field bus module parameters, functional safety module parameters, braking chopper parameters, I/O module parameters). The parameter settings may also include drive applications. The other relevant process information may include load information, torque information, motor speed information, power consumption information, or any other relevant process information.

After the download of the configuration parameter setting is completed, the user apparatus 20 detects the completion of the session establishment and based on said downloaded configuration parameter setting calculates value data for a configuration parameter data user interface of said user apparatus 20. Thereafter, the user apparatus 20 establishes a session to a server 22 and forwards in point 3-9 to said server 22, calculated value data for said configuration parameter data user interface of said user apparatus 20 and/or the configuration parameter setting downloaded from said electric drive 21.

Referring to FIG. 4, the server 22 receives in point 3-9 from the user apparatus 20 the forwarded calculated value data for said configuration parameter data user interface of said user apparatus 20 and/or the configuration parameter setting downloaded from said electric drive 21. Thereafter, the server 22 initiates a session 3-10 for sharing said calculated value data for said configuration parameter data user interface of said user apparatus 20. The server 22 provides a tagged version of each of the screen of the configuration parameter data user interface and shares i.e. mirrors said each of the screen of the configuration parameter data user interface with said tagged version of the local UI (UI, user interface), i.e. remote UI.

Thereafter, the server 22 establishes a screen sharing session to a service desk 24 in point 3-11. Likewise, the server 22 establishes a screen sharing session to said user apparatus 20 in point 3-12. The server 22 then shares in said screen sharing sessions said calculated value data to be displayed by the user interfaces of said user apparatus 20 (point 3-11) and of said service desk 24 (point 3-12).

Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

Referring to FIG. 4, during the screen sharing session according to the presented exemplary situation, the user apparatus 20 initiates a session 3-13 for updating configuration parameter setting of the electric drive. Thereafter, the user apparatus 20 (i.e. the electric drive apparatus remote support tool application in said user apparatus 20) updates a configuration parameter setting of the electric drive 21 to the user apparatus 20; the messages 3-14 illustrate the update session establishment and information exchange between the user apparatus 20 and said electric drive 21.

After the updating of the configuration parameter setting is completed, based on said updated configuration parameter setting and said information exchange between the user apparatus 20 and said electric drive 21, the user apparatus 20 calculates updated value data for a configuration parameter data user interface of said user apparatus 20. Thereafter, the user apparatus 20 establishes a session to a server 22 and forwards in point 3-15, updated value data for said configuration parameter data user interface of said user apparatus 20 and/or the updated configuration parameter setting downloaded from said electric drive 21.

Referring to FIG. 4, the server 22 receives in point 3-15 from the user apparatus 20 the updated value data for said configuration parameter data user interface of said user apparatus 20 and/or the updated configuration parameter setting downloaded from said electric drive 21. Thereafter, the server 22 initiates a session 3-16 for sharing said updated value data for said configuration parameter data user interface of said user apparatus 20. Thereafter, the server 22 establishes a screen sharing session to a service desk 24 in point 3-17. Likewise, the server 22 establishes a screen sharing session to said user apparatus 20 in point 3-18. The server 22 then shares in said screen sharing sessions said updated value data to be displayed by the user interfaces of said user apparatus 20 (point 3-17) and of said service desk 24 (point 3-18).

In the end of the screen sharing sessions 3-17 and 3-18, the server 22 may detect or receive in point 3-27 e.g. from said electric drive apparatus remote support tool application in said user apparatus 20, information indicating to end the screen sharing sessions. In response to receiving, or detecting in point 3-27 information indicating to end the screen sharing sessions, the server 22 releases in point 3-27 the screen sharing sessions and the connection and resources reserved for them. Further, the electric drive apparatus remote support tool application in said user apparatus 20 may shut down, unless needed for other corresponding sessions.

Figure 5:
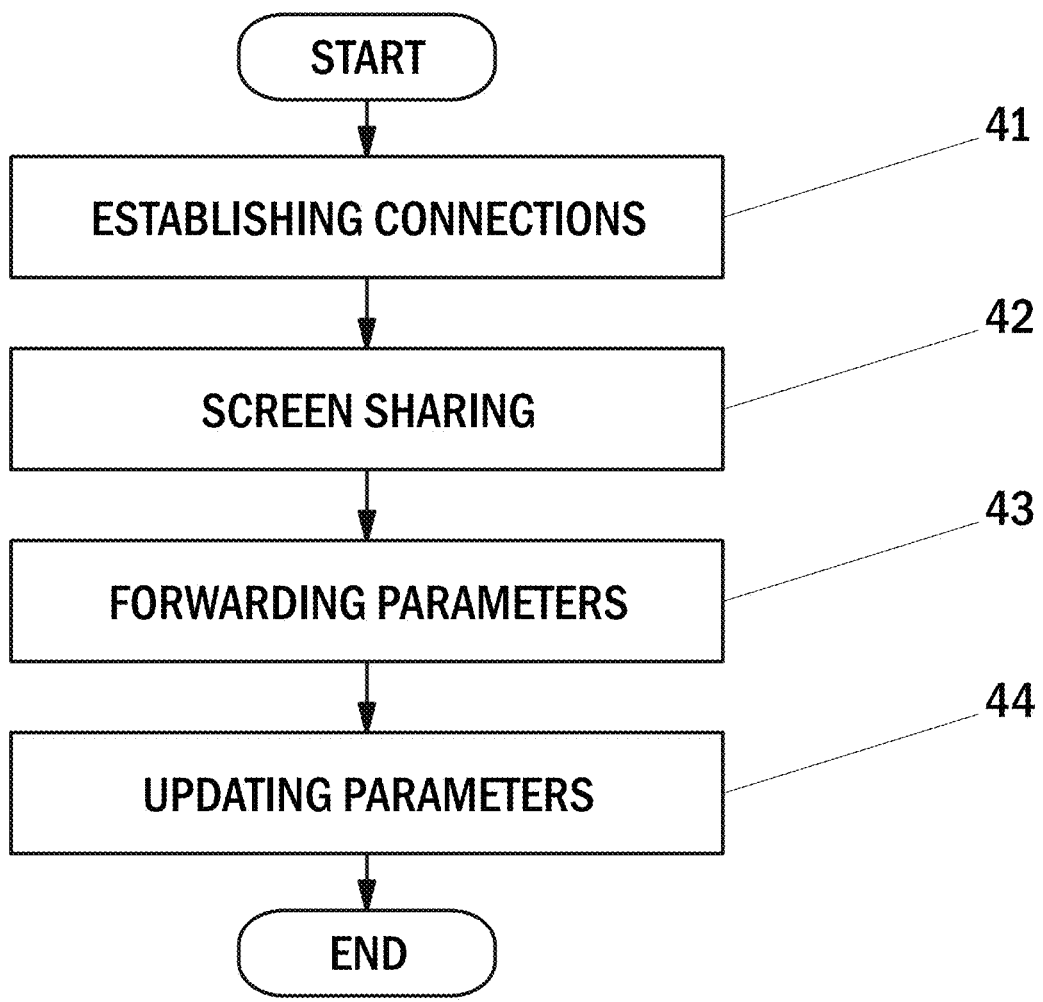
FIG. 5 is a flow chart illustrating exemplary of a method for remote support of an electric drive apparatus according to an exemplary embodiment of the present invention.

FIG. 5 is a flow chart illustrating exemplary of a method for remote support of an electric drive apparatus according to an exemplary embodiment of the present invention. FIG. 5 illustrates an exemplary functionality of an electric drive apparatus remote support tool application, e.g. a mobile application. In the example illustrated in FIG. 5 it is assumed that the electric drive apparatus remote support tool application program is ended either in response to the user of the corresponding apparatus, e.g. user apparatus 20, providing such an input, or corresponding input is received from other apparatus.

Referring to FIG. 5, an electric drive apparatus remote support tool application, e.g. a mobile application, is started in a user apparatus 20, UA. Thereafter, in said method for remote support of an electric drive apparatus according to the present embodiment, the user apparatus 20 establishes 41 a local connection to an electric drive 21 and also establishes 41 another connection to a server 22 for forwarding an indication of a configuration parameter data user interface of said user apparatus 20 as being used by said user apparatus 20. In said connection establishment 41, said user apparatus 20 also forwards an indication of a configuration parameter data user interface of said user apparatus 20 to said server 22. Furthermore, said server 22 establishes 41 a connection for a screen sharing session to a service desk 24 and another connection for a screen sharing session to said user apparatus 20.

After the connection establishment 41, the server 22 starts a session for screen sharing 42 a configuration parameter data user interface of said user apparatus 20 to said service desk 24 and to said user apparatus 20. In said screen sharing 42 The server 22 provides a tagged version of each of the screen of the configuration parameter data user interface and shares i.e. mirrors said each of the screen of the configuration parameter data user interface with said tagged version of the local UI (UI, user interface), i.e. remote UI. The server 22 may do this, for example, by utilizing a web page that resembles the screen display of the application of the user apparatus 20, e.g. the mobile screen.

After the screen sharing sessions have been activated 42, the user apparatus 20 initiates a session for forwarding parameters 43, i.e. for forwarding configuration parameter setting of the electric drive. In said parameters forwarding 43 the user apparatus 20 downloads a configuration parameter setting of said electric drive 21; calculates value data for a configuration parameter data user interface of said user apparatus 20 based on said downloaded configuration parameter setting, and forwards to said server 22 said calculated value data for said configuration parameter data user interface of said user apparatus 20 and/or the configuration parameter setting. The configuration parameter setting includes, but is not limited to, the drive parameter settings, process parameter settings, and other relevant process information downloaded from the electric drive 21.

The downloaded and forwarded parameter settings may include parameters including but being not limited to: electric drive model parameters, drive component version parameters, functional drive parameters (including drive motor rating parameters), physical drive parameters, drive test parameters (including drive motor ID run result parameters), user generated parameters, drive application generated parameters, drive accessory parameters, drive optional module/hardware parameters (including field bus module parameters, functional safety module parameters, braking chopper parameters, I/O module parameters). The parameter settings may also include drive applications. The other relevant process information may include load information, torque information, motor speed information, power consumption information, or any other relevant process information.

With the help of the activated screen sharing sessions, said service desk 24 and said user apparatus 20 can both receive and share the same configuration parameter data user interface of said user apparatus 20. Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

After the configuration parameter setting has been forwarded 43, the user apparatus 20 initiates a session for updating 44 configuration parameter setting of the electric drive. In said parameters updating 44 the user apparatus 20 updates a configuration parameter setting of the electric drive 21; calculates updated value data for a configuration parameter data user interface of said user apparatus 20, and forwards to said server 22 said updated value data for said configuration parameter data user interface of said user apparatus 20 and/or the updated configuration parameter. The server 22 then shares the updated value data with the help of the screen sharing sessions to be displayed by the user interfaces of said user apparatus 20 and of said service desk 24.

With the help of the activated screen sharing sessions, said service desk 24 and said user apparatus 20 can both receive and share the same updated value data in a displayed configuration parameter data user interface of said user apparatus 20.

Figure 6:
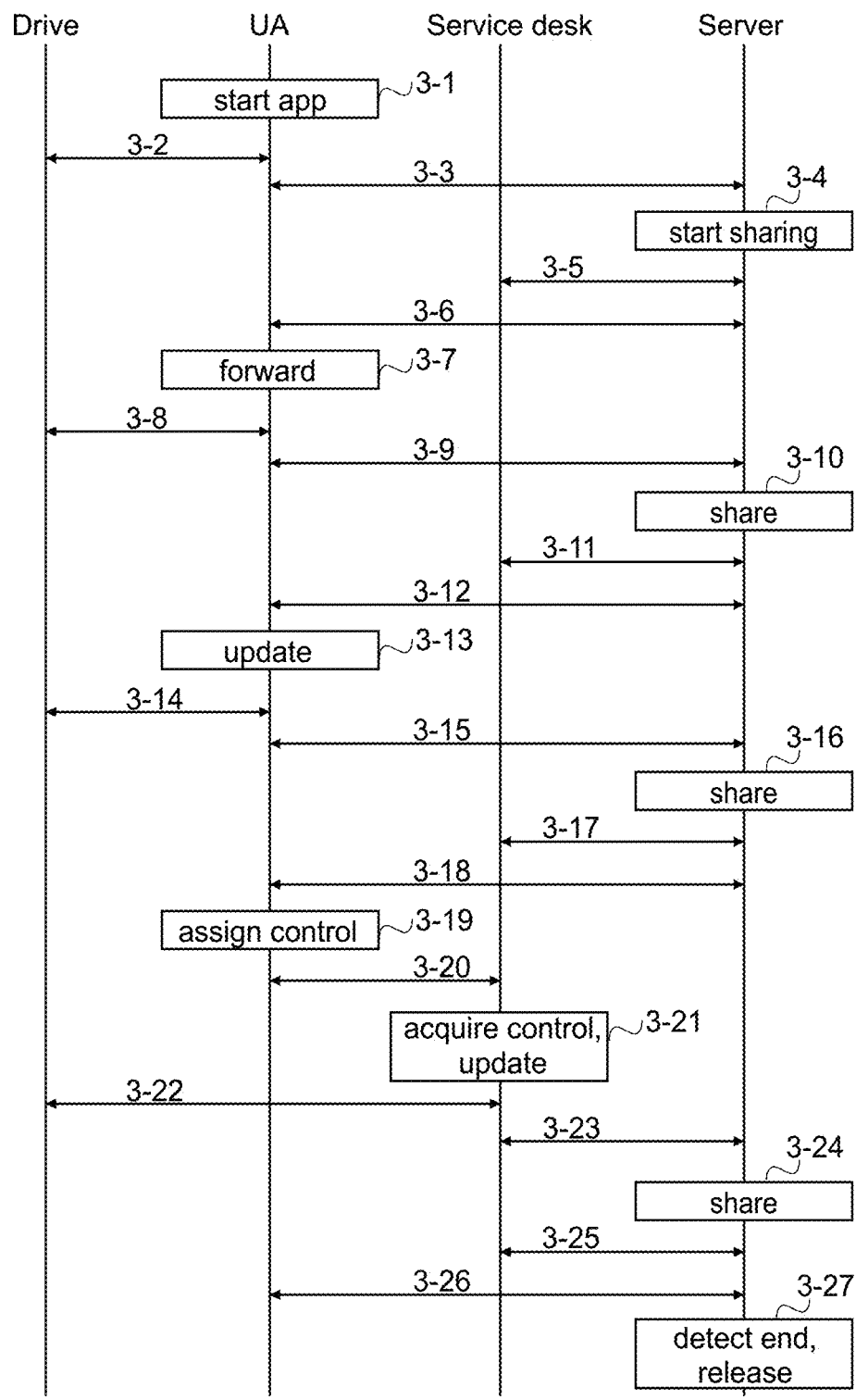
FIG. 6 illustrates another exemplary information exchange according to another exemplary embodiment of the present invention.

FIG. 6 illustrates another exemplary information exchange according to an exemplary embodiment of the present invention. FIG. 6 illustrates information exchange in another exemplary situation in which a remote support tool application is utilized for controlling and/or parameter configuration of an electric drive apparatus for example. Further, in the illustrated an another exemplary situation a service desk is utilized as another remote support resource for controlling and/or parameter configuration of an electric drive apparatus for example.

Referring to FIG. 6, when the user starts (point 3-1) an electric drive apparatus remote support tool, e.g. a user application such as a mobile application (app), a tablet application or a desktop application, in a user apparatus 20, UA, a local connection to an electric drive 21 is established; the messages 3-2 illustrate the session establishment and information exchange between them. After the session establishment is completed, the user apparatus 20 initiates in point 3-3, the establishing a connection to a server 22. The user apparatus 20 establishes a session to a server 22 and forwards in point 3-3 an indication of a configuration parameter data user interface of said user apparatus 20.

Referring to FIG. 6, the server 22 receives in point 3-3 from the user apparatus 20 the indication of a configuration parameter data user interface of said user apparatus 20 and initiates a session 3-4 for starting sharing said configuration parameter data user interface of said user apparatus 20. The server 22 provides a tagged version of each of the screen of the configuration parameter data user interface and shares i.e. mirrors said each of the screen of the configuration parameter data user interface with said tagged version of the local UI (UI, user interface), i.e. remote UI. Thereafter, the server 22 establishes a screen sharing session to a service desk 24 in point 3-5. Likewise, the server 22 establishes a screen sharing session to said user apparatus 20 in point 3-6. The server 22 shares in said screen sharing sessions the configuration parameter data user interface of said user apparatus 20 to be displayed by the user interfaces of said user apparatus 20 (point 3-5) and with said service desk 24 (point 3-6).

After the screen sharing session has been established, the user apparatus 20 detects the completion of the screen sharing session establishment and initiates a session 3-7 for forwarding configuration parameter setting of the electric drive. Thereafter, unlike in prior art solution, the user apparatus 20 (i.e. the electric drive apparatus remote support tool application in said user apparatus 20) downloads a configuration parameter setting of said electric drive 21 to the user apparatus 20; the messages 3-8 illustrate the download session establishment and information exchange and download between them. The configuration parameter setting includes, but is not limited to, the drive parameter settings, process parameter settings, and other relevant process information downloaded from the electric drive 21.

After the download of the configuration parameter setting is completed, the user apparatus 20 detects the completion of the session establishment and based on said downloaded configuration parameter setting calculates value data for a configuration parameter data user interface of said user apparatus 20. Thereafter, the user apparatus 20 establishes a session to a server 22 and forwards in point 3-9 to said server 22, calculated value data for said configuration parameter data user interface of said user apparatus 20 and/or the configuration parameter setting downloaded from said electric drive 21.

Referring to FIG. 6, the server 22 receives in point 3-9 from the user apparatus 20 the forwarded calculated value data for said configuration parameter data user interface of said user apparatus 20 and/or the configuration parameter setting downloaded from said electric drive 21. Thereafter, the server 22 initiates a session 3-10 for sharing said calculated value data for said configuration parameter data user interface of said user apparatus 20. The server 22 provides a tagged version of each of the screen of the configuration parameter data user interface and shares i.e. mirrors said each of the screen of the configuration parameter data user interface with said tagged version of the local UI (UI, user interface), i.e. remote UI. Thereafter, the server 22 establishes a screen sharing session to a service desk 24 in point 3-11. Likewise, the server 22 establishes a screen sharing session to said user apparatus 20 in point 3-12. The server 22 then shares in said screen sharing sessions said calculated value data to be displayed by the user interfaces of said user apparatus 20 (point 3-11) and of said service desk 24 (point 3-12). Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

Referring to FIG. 6, during the screen sharing session according to the presented exemplary situation, the user apparatus 20 initiates a session 3-13 for updating configuration parameter setting of the electric drive. Thereafter, the user apparatus 20 (i.e. the electric drive apparatus remote support tool application in said user apparatus 20) updates a configuration parameter setting of the electric drive 21 to the user apparatus 20; the messages 3-14 illustrate the update session establishment and information exchange between the user apparatus 20 and said electric drive 21.

After the updating of the configuration parameter setting is completed, based on said updated configuration parameter setting and said information exchange between the user apparatus 20 and said electric drive 21, the user apparatus 20 calculates updated value data for a configuration parameter data user interface of said user apparatus 20. Thereafter, the user apparatus 20 establishes a session to a server 22 and forwards in point 3-15, updated value data for said configuration parameter data user interface of said user apparatus 20 and/or the updated configuration parameter setting downloaded from said electric drive 21.

Referring to FIG. 6, the server 22 receives in point 3-15 from the user apparatus 20 the updated value data for said configuration parameter data user interface of said user apparatus 20 and/or the updated configuration parameter setting downloaded from said electric drive 21. Thereafter, the server 22 initiates a session 3-16 for sharing said updated value data for said configuration parameter data user interface of said user apparatus 20. Thereafter, the server 22 establishes a screen sharing session to a service desk 24 in point 3-17. Likewise, the server 22 establishes a screen sharing session to said user apparatus 20 in point 3-18. The server 22 then shares in said screen sharing sessions said updated value data to be displayed by the user interfaces of said user apparatus 20 (point 3-17) and of said service desk 24 (point 3-18).

In the another exemplary embodiment of the present invention presented in FIG. 6, the user initiates (point 3-19) the assigning of control from the user apparatus 20 to the service desk 24. Consequently, a local connection for assigning of control from the user apparatus 20 to the service desk 24 is established; the messages 3-20 illustrate the session establishment, assigning of control and information exchange between them. Referring to FIG. 6, the service desk 24 acquires control and initiates a session 3-21 for updating configuration parameter setting of the electric drive. Thereafter, the service desk 24 updates a configuration parameter setting of the electric drive 21 to the service desk 24; the messages 3-22 illustrate the update session establishment and information exchange between the service desk 24 and said electric drive 21.

After the updating of the configuration parameter setting is completed, based on said updated configuration parameter setting and said information exchange between the service desk 24 and said electric drive 21, the service desk 24 calculates updated value data for a configuration parameter data user interface of said user apparatus 20. Thereafter, the service desk 24 establishes a session to a server 22 and forwards in point 3-23, updated value data for said configuration parameter data user interface of said user apparatus 20 and/or the updated configuration parameter setting downloaded from said electric drive 21.

Referring to FIG. 6, the server 22 receives in point 3-23 from the service desk 24 the updated value data for said configuration parameter data user interface of said user apparatus 20 and/or the updated configuration parameter setting downloaded from said electric drive 21. Thereafter, the server 22 initiates a session 3-24 for sharing said updated value data for said configuration parameter data user interface of said user apparatus 20. Thereafter, the server 22 establishes a screen sharing session to said service desk 24 in point 3-25. Likewise, the server 22 establishes a screen sharing session to said user apparatus 20 in point 3-26. The server 22 then shares in said screen sharing sessions said updated value data to be displayed by the user interfaces of said user apparatus 20 (point 3-25) and of said service desk 24 (point 3-26).

In the end of the screen sharing sessions 3-25 and 3-26, the server 22 may detect or receive in point 3-27 e.g. from said electric drive apparatus remote support tool application in said user apparatus 20, information indicating to end the screen sharing sessions. In response to receiving, or detecting in point 3-27 information indicating to end the screen sharing sessions, the server 22 releases in point 3-27 the screen sharing sessions and the connection and resources reserved for them. Further, the electric drive apparatus remote support tool application in said user apparatus 20 may shut down, unless needed for other corresponding sessions.

Figure 7:
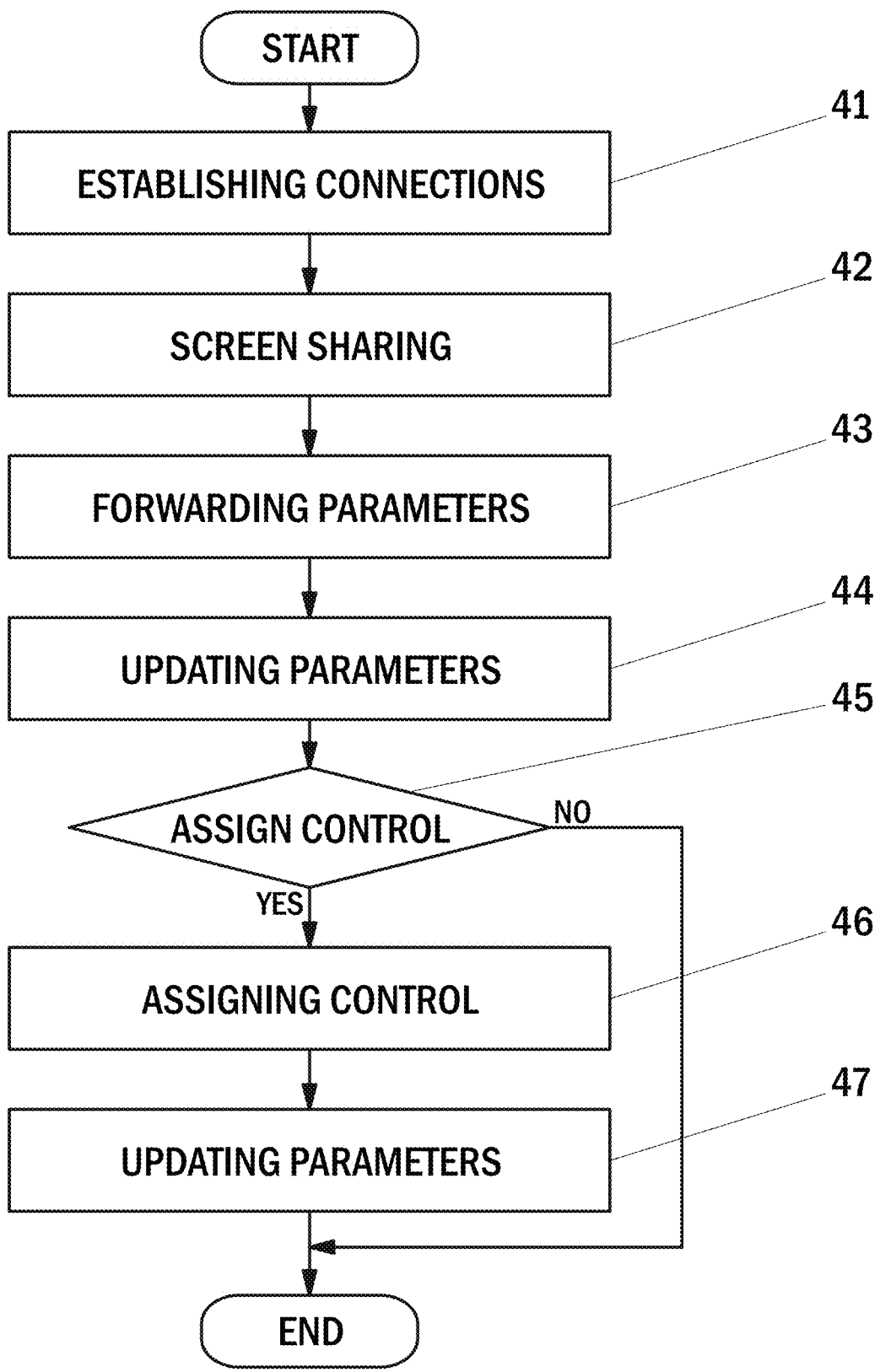
FIG. 7 is a flow chart illustrating another exemplary of a method for remote support of an electric drive apparatus according to another exemplary embodiment of the present invention.

FIG. 7 is a flow chart illustrating another exemplary of a method for remote support of an electric drive apparatus according to another exemplary embodiment of the present invention. FIG. 7 illustrates another exemplary functionality of an electric drive apparatus remote support tool application, e.g. a mobile application. In the example illustrated in FIG. 7 it is assumed that the electric drive apparatus remote support tool application program is ended either in response to the user of the corresponding apparatus, e.g. user apparatus 20, providing such an input, or corresponding input is received from other apparatus.

Referring to FIG. 7, an electric drive apparatus remote support tool application, e.g. a mobile application, is started in a user apparatus 20, UA. Thereafter, in said method for remote support of an electric drive apparatus according to the present embodiment, the user apparatus 20 establishes 41 a local connection to an electric drive 21 and also establishes 41 another connection to a server 22 for forwarding an indication of a configuration parameter data user interface of said user apparatus 20 as being used by said user apparatus 20. In said connection establishment 41, said user apparatus 20 also forwards an indication of a configuration parameter data user interface of said user apparatus 20 to said server 22. Furthermore, said server 22 establishes 41 a connection for a screen sharing session to a service desk 24 and another connection for a screen sharing session to said user apparatus 20.

After the connection establishment 41, the server 22 starts a session for screen sharing 42 a configuration parameter data user interface of said user apparatus 20 to said service desk 24 and to said user apparatus 20. In said screen sharing 42 The server 22 provides a tagged version of each of the screen of the configuration parameter data user interface and shares i.e. mirrors said each of the screen of the configuration parameter data user interface with said tagged version of the local UI (UI, user interface), i.e. remote UI. The server 22 may do this, for example, by utilizing a web page that resembles the screen display of the application of the user apparatus 20, e.g. the mobile screen.

After the screen sharing sessions have been activated 42, the user apparatus 20 initiates a session for forwarding parameters 43, i.e. for forwarding configuration parameter setting of the electric drive. In said parameters forwarding 43 the user apparatus 20 downloads a configuration parameter setting of said electric drive 21; calculates value data for a configuration parameter data user interface of said user apparatus 20 based on said downloaded configuration parameter setting, and forwards to said server 22 said calculated value data for said configuration parameter data user interface of said user apparatus 20 and/or the configuration parameter setting. The configuration parameter setting includes, but is not limited to, the drive parameter settings, process parameter settings, and other relevant process information downloaded from the electric drive 21.

After the configuration parameter setting has been forwarded 43, the user apparatus 20 initiates a session for updating 44 configuration parameter setting of the electric drive. In said parameters updating 44 the user apparatus 20 updates a configuration parameter setting of the electric drive 21; calculates updated value data for a configuration parameter data user interface of said user apparatus 20, and forwards to said server 22 said updated value data for said configuration parameter data user interface of said user apparatus 20 and/or the updated configuration parameter.

The server 22 then shares the updated value data with the help of the screen sharing sessions to be displayed by the user interfaces of said user apparatus 20 and of said service desk 24.

In the another exemplary embodiment of the present invention presented in FIG. 7, the user may select in step 45 to assign control from the user apparatus 20 to the service desk 24. Consequently, a local connection for assigning of control from the user apparatus 20 to the service desk 24 is established and the control is assigned 45 from the user apparatus 20 to the service desk 24.

As a next step in another exemplary embodiment of the present invention, the service desk acquires 46 control from the user apparatus. After acquiring control 46, the service desk 24 updates configuration parameter setting of the electric drive. Thereafter, the service desk 24 initiates a session for updating 47 configuration parameter setting of the electric drive. In said parameters updating 47 the service desk 24 updates a configuration parameter setting of the electric drive 21; calculates updated value data for a configuration parameter data user interface of said user apparatus 20, and forwards to said server 22 said updated value data for said configuration parameter data user interface of said user apparatus 20 and/or the updated configuration parameter. The server 22 then shares the updated value data with the help of the screen sharing sessions displayed by the user interfaces of said user apparatus 20 and of said service desk 24.

With the help of the activated screen sharing sessions, said service desk 24 and said user apparatus 20 can both receive and share the same updated value data in a displayed configuration parameter data user interface of said user apparatus 20. Both the screen place, i.e. which screen it is on, and its content, i.e. parameter list that are on that screen, are linked between the local UI and remote UI, and will be updated simultaneously when either of the local user or the remote user make updates on their respective screens. The content viewed on the screen may include parameter data, e.g. configuration parameter data, measured value data, calculated value data and/or additional textual information.

The steps, points, related functions, and information exchanges described above by means of FIGS. 4 to 7 are in no absolute chronological order, and some of them may be performed simultaneously or in an order differing from the given one. Other functions can also be executed between them or within them, and other information may be sent. Some of the steps or points or part of the steps or points or one or more pieces of information can also be left out or replaced by a corresponding step, point or part of the step, point or one or more pieces of information. For example, it should be appreciated that the user input received via a user interface and/or as received information may relate only one, two or three of the examples mentioned above with FIG. 5 or with FIG. 5, and/or further information exchange not expressly mentioned may be involved, using the above described principles.

The above steps, points, related functions, and information exchanges described above by means of FIGS. 4 to 7 do not necessarily happen at the same time and the whole process described above by means of FIGS. 3 to 6 does not have to be done by same persons to a single target electrical drive. For example, the converted parameter data, e.g. a new configuration parameter setting of a electric drive 21, can be saved in the server 22 at a first time by a first user and be downloaded to one or more electric drives by another engineer later at a second different time by a second user, given that the second has proper authorization/access rights to download said new configuration parameter setting from said server 22.

The techniques and methods described herein may be implemented by various means so that a user apparatus/user device and/or a server/database server configured to support configuration of an electric drive apparatus, based on at least partly on what is disclosed above with any of FIGS. 4 to 7, including implementing one or more functions/operations of a corresponding user apparatus and/or a server described above with an embodiment/example, for example by means of FIGS. 4 to 7, comprises not only prior art means, but also means for implementing the one or more functions/operations of a corresponding functionality described with an embodiment, for example by means of FIGS. 3 to 6, and it or they may comprise separate means for each separate function/operation, or means may be configured to perform two or more functions/operations. For example, one or more of the means described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 4 to 7, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 8:
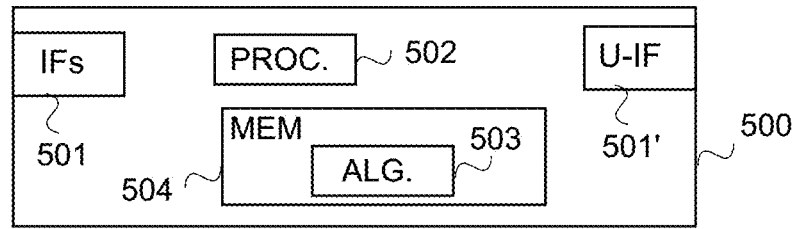
FIG. 8 illustrates an apparatus according to some embodiments of the present invention in connection with the user apparatus/user device.

FIG. 8 illustrates an apparatus according to some embodiments of the present invention in connection with the user apparatus/user device. FIG. 8 illustrates an apparatus configured to carry out the functions described above in connection with the user apparatus/user device. Each apparatus 500 may comprise one or more communication control circuitry, such as at least one processor 502, and at least one memory 504, including one or more algorithms 503, such as a computer program code (software) wherein the at least one memory and the computer program code (software) are configured, with the at least one processor, to cause the apparatus to carry out any one of the exemplified functionalities of the user apparatus. The apparatus may further comprise different communication interfaces 501 and one or more user interfaces 501'.

Referring to FIG. 8, at least one of the communication control circuitries in the apparatus 500 is configured to provide the remote support unit, or any corresponding sub-unit, and to carry out functionalities, described above by means of FIGS. 4 to 7, by one or more circuitries.

Figure 9:
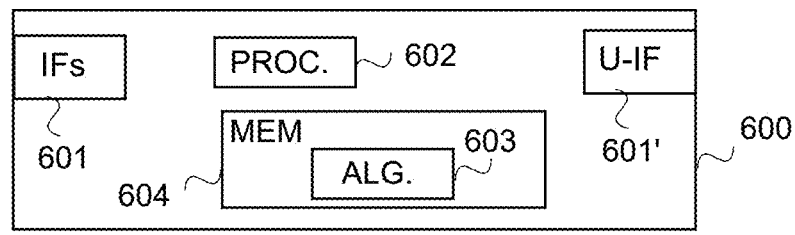
FIG. 9 illustrates an apparatus according to some embodiments of the present invention in connection with the service desk.

FIG. 9 illustrates an apparatus according to some embodiments of the present invention in connection with the service desk. FIG. 9 illustrates an apparatus configured to carry out the functions described above in connection with the service desk. Each apparatus 600 may comprise one or more communication control circuitry, such as at least one processor 602, and at least one memory 604, including one or more algorithms 603, such as a computer program code (software) wherein the at least one memory and the computer program code (software) are configured, with the at least one processor, to cause the apparatus to carry out any one of the exemplified functionalities of the service desk. The apparatus may further comprise different communication interfaces 601 and one or more user interfaces 601'.

Referring to FIG. 9, at least one of the communication control circuitries in the apparatus 600 is configured to provide the remote support unit, and to carry out functionalities, described above by means of FIGS. 4 to 7, by one or more circuitries.

Figure 10:
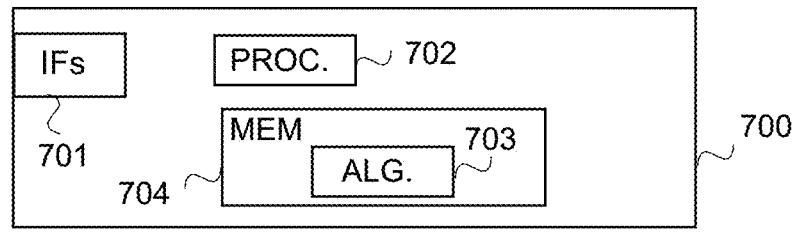
FIG. 10 illustrates an apparatus according to some embodiments of the present invention in connection with the server.

FIG. 10 illustrates an apparatus according to some embodiments of the present invention in connection with the server. FIG. 10 illustrates an apparatus configured to carry out the functions described above in connection with the server. Each apparatus 700 may comprise one or more communication control circuitry, such as at least one processor 702, and at least one memory 704, including one or more algorithms 703, such as a computer program code (software) wherein the at least one memory and the computer program code (software) are configured, with the at least one processor, to cause the apparatus to carry out any one of the exemplified functionalities of the server. The memory 704 may comprise a database for storing different information, for example contact information on apparatuses, and information needed for maintenance. The apparatus may further comprise different communication interfaces 701.

Referring to FIG. 10, at least one of the communication control circuitries in the apparatus 700 is configured to provide the remote support unit, and to carry out functionalities, described above by means of FIGS. 4 to 7, by one or more circuitries.

The memory 504, 604, 704 or part of it may be implemented using any suitable data storage technology, such as semiconductor based memory devices, flash memory, magnetic memory devices and systems, optical memory devices and systems, fixed memory and removable memory.

The one or more communication interfaces (TX/RX) 501, 601, 701 may comprise hardware and/or software for realizing communication connectivity according to one or more communication protocols. The communication interface 501, 601, 701 may comprise standard well-known components such as an amplifier, filter, frequency-converter, (de)modulator, and encoder/decoder circuitries and one or more antennas. The communication interfaces 501, 601, 701 may comprise radio interface components and/or other wireless interface components providing the apparatus with wireless communication capability.

A user interface 501', 601' may be any kind of a user interface, for example a screen, microphone, headset, head-mounted display, and/or one or more loudspeakers for interaction with the user.

With the help of the present invention, a local user of the drive, e.g. maintenance staff or customer, can build a local connection with a drive e.g. via Bluetooth® (or Wi-Fi) of a mobile app (or tablet, desktop application), while also having a real-time connection with remote support engineers. Said local user can e.g. enter a real time remote support session with the remote support engineer and the aim of this live session is to cooperatively, in real time identify the issues and solve them immediately.

The invention provides to the local user screen synchronization and sharing without pixel transmission during joint debugging session. The solution according to the invention brings about a capability for updating parameters and allows both the remote support person making the update and the local user simultaneously view a synchronized screen content during the debugging session. The local user will see his/her mobile application start to navigate by itself and make changes to some particular parameters as the remote support person is making the update. The solution according to the invention gives the local user a lot of clarity and confidence for what the remote support person is doing and for feeling comfortable about it. The solution according to the invention also allows the remote support person to view a synchronized screen content as a local user is making the update.

With the help of the present invention, a user, e.g. a customer or a service engineer, can update parameters of the electric drive and the local user simultaneously view a synchronized screen content during the debugging session by using a user apparatus, e.g. a mobile phone via a Bluetooth connection, said user apparatus being connected to a server. Said server can e.g. be realized as an intelligent cloud-based storage server.

With the help of the present invention, the data transfer needed between the mobile application and the server is only the page tag and parameter values, which is much smaller data amount than each and every pixel of the screen. With the help of the present invention a data set, i.e. a set of different parameters, can be defined and shared/mirrored between a local phone and a remote server. Said remote user could also specify what said data set includes, such as e.g. configuration settings, sampling rates etc. Said data can then be buffered and shared.

The solution according to the present invention provides mirroring data between a cloud server and local device just by using unique ID tags. In addition, the data stored and managed in said cloud server can be identified using local device ID. Based on ID the data entries can be found and downloaded via local UI to a local device. With the help of the solution according to the present invention only a small amount of data transmission as necessary between a drive and a local UI, e.g. a mobile device or a personal computer.

As used in this application, the term "circuitry" refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of "circuitry" applies to all uses of this term in this application. As a further example, as used in this application, the term "circuitry'" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a user apparatus or a similar integrated circuit in a service desk, or in a server.

In an embodiment, the at least one processor, the memory, and the computer program code form processing means or comprises one or more computer program code portions for carrying out one or more operations according to any one of the embodiments of FIGS. 4 to 7 or operations thereof.

Embodiments as described may also be carried out in the form of a computer process defined by a computer program or portions thereof. Embodiments of the methods described in connection with FIGS. 4 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electric carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

It will be obvious to a person skilled in the art that, as technology advances, the inventive concept can be implemented in various ways. The invention and its embodiments are not limited to the examples described above but may vary within the scope of the claims.

What is claimed is:

1. A method comprising:
   starting in a first apparatus a remote support tool application, said first apparatus having a connection with an at least one electric drive apparatus in a local site;
   forwarding by said first apparatus an indication of a configuration parameter data user interface of said first apparatus to a third apparatus in a remote site; and
   receiving by said first apparatus from said third apparatus at least one tagged version of a screen of the configuration parameter data user interface of said first apparatus, the at least one tagged version of the screen including a page tag and parameter values.

2. The method of claim 1, further comprising:
   downloading by said first apparatus a configuration parameter setting from said at least one electric drive apparatus in a local site;
   forwarding by said first apparatus to said third apparatus a calculated value data for said configuration parameter data user interface of said first apparatus and/or said configuration parameter setting downloaded from said at least one electric drive apparatus; and
   receiving by said first apparatus from said third apparatus at least one tagged version of a screen of the configuration parameter data user interface of said first apparatus, said at least one tagged version of a screen of the configuration parameter data user interface of said first apparatus comprising said calculated value data and/or said configuration parameter setting.

3. The method of claim 1, further comprising:
   updating by said first apparatus a configuration parameter setting of said at least one electric drive apparatus in a local site;
   forwarding by said first apparatus to said third apparatus an updated value data for said configuration parameter data user interface of said first apparatus and/or said updated configuration parameter setting; and
   receiving by said first apparatus from said third apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

4. The method of claim 1, further comprising:
   assigning of control by said first apparatus to a second apparatus in a remote support site.

5. The method of claim 1, comprising:
   displaying the screen with the first apparatus based on the received at least one tagged version of the screen;
   wherein the first apparatus does not use pixel information received from the third apparatus to display the screen.

6. The method of claim 1, comprising:
   displaying the screen with the first apparatus based on the received at least one tagged version of the screen;
   wherein the tagged version of the screen contains the page tag and the parameter values.

7. A method comprising:
   receiving in a third apparatus in a remote site from a first apparatus, said first apparatus having a connection with an at least one electric drive apparatus in a local site, an indication of a configuration parameter data user interface of said first apparatus to said third apparatus; and
   forwarding by said third apparatus to said first apparatus and to a second apparatus in a remote support site at least one tagged version of a screen of the configuration parameter data user interface of said first apparatus, the at least one tagged version of the screen including a page tag and parameter values.

8. The method of claim 7, further comprising:
   receiving in said third apparatus from said first apparatus, a calculated value data for said configuration parameter data user interface of said first apparatus and/or a configuration parameter setting downloaded from said at least one electric drive apparatus; and
   forwarding by said third apparatus to said first apparatus and to said second apparatus at least one tagged version of a screen of the configuration parameter data user interface of said first apparatus, said at least one tagged version of a screen of the configuration parameter data user interface of said first apparatus comprising said calculated value data and/or said configuration parameter setting.

9. The method of claim 7, further comprising:
   receiving in said third apparatus from said first apparatus, an updated value data for said configuration parameter data user interface of said first apparatus and/or an updated configuration parameter setting; and
   forwarding by said third apparatus to said first apparatus and to said second apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

10. The method of claim 7, further comprising:
receiving in said third apparatus from said second apparatus, an updated value data for said configuration parameter data user interface of said first apparatus and/or an updated configuration parameter setting; and
forwarding by said third apparatus to said first apparatus and to said second apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

11. A method comprising:
receiving by a second apparatus in a remote support site from a third apparatus in a remote site at least one tagged version of a screen of the configuration parameter data user interface of a first apparatus, said first apparatus having a connection with an at least one electric drive apparatus in a local site;
acquiring control by said second apparatus from said first apparatus;
forwarding by said second apparatus to said third apparatus an updated value data for a configuration parameter data user interface of said first apparatus and/or an updated configuration parameter setting; and
receiving by said second apparatus from said third apparatus at least one tagged version of a screen of the configuration parameter data user interface of said first apparatus, said at least one tagged version of a screen of the configuration parameter data user interface of said first apparatus comprising a page tag and parameter values including said updated value data and/or said updated configuration parameter setting.

12. A non-transitory computer-readable storage medium comprising:
computer program instructions structured to be executed by a processor effective to:
forward, when a remote support tool application is started in a first apparatus comprising the processor and having a connection with an at least one electric drive apparatus in a local site, by said first apparatus an indication of a configuration parameter data user interface of said first apparatus to a third apparatus in a remote site; and
cause receiving by said first apparatus from said third apparatus at least one tagged version of a screen of the configuration parameter data user interface of said first apparatus, the at least one tagged version of the screen including a page tag and parameter values.

13. The non-transitory computer-readable storage medium of claim 12, wherein the computer program instructions are further structured to be executed by the processor effective to:
download by said first apparatus a configuration parameter setting from said at least one electric drive apparatus in a local site;
cause forwarding by said first apparatus to said third apparatus a calculated value data for said configuration parameter data user interface of said first apparatus and/or said configuration parameter setting downloaded from said at least one electric drive apparatus; and
cause receiving by said first apparatus from said third apparatus at least one tagged version of a screen of the configuration parameter data user interface of said first apparatus, said at least one tagged version of a screen of the configuration parameter data user interface of said first apparatus comprising said calculated value data and/or said configuration parameter setting.

14. The non-transitory computer-readable storage medium of claim 12, wherein the computer program instructions are further structured to be executed by the processor effective to:
update by said first apparatus a configuration parameter setting of said at least one electric drive apparatus in a local site;
cause forwarding by said first apparatus to said third apparatus an updated value data for said configuration parameter data user interface of said first apparatus and/or an updated configuration parameter setting; and
cause receiving by said first apparatus from said third apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

15. A non-transitory computer-readable storage medium comprising:
computer program instructions structured to be executed by a processor effective to:
cause receiving, in a third apparatus in a remote site, said third apparatus comprising the processor, from a first apparatus, said first apparatus having a connection with an at least one electric drive apparatus in a local site, an indication of a configuration parameter data user interface of said first apparatus to said third apparatus; and
cause forwarding by said third apparatus to said first apparatus and to a second apparatus in a remote support site at least one tagged version of a screen of the configuration parameter data user interface of said first apparatus, the at least one tagged version of the screen including a page tag and parameter values.

16. The non-transitory computer-readable storage medium of claim 15, wherein the computer program instructions are further structured to be executed by the processor effective to:
cause receiving in said third apparatus from said first apparatus, a calculated value data for said configuration parameter data user interface of said first apparatus and/or said configuration parameter setting downloaded from said at least one electric drive apparatus; and
cause forwarding by said third apparatus to said first apparatus and to said second apparatus at least one tagged version of a screen of the configuration parameter data user interface of said first apparatus, said at least one tagged version of a screen of the configuration parameter data user interface of said first apparatus comprising said calculated value data and/or said configuration parameter setting.

17. The non-transitory computer-readable storage medium of claim 15, wherein the computer program instructions are further structured to be executed by the processor effective to:
cause receiving in said third apparatus from said first apparatus, an updated value data for said configuration parameter data user interface of said first apparatus and/or an updated configuration parameter setting; and cause forwarding by said third apparatus to said first apparatus and to said second apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

18. The non-transitory computer-readable storage medium of claim 15, wherein the computer program instructions are further structured to be executed by the processor effective to:

cause receiving in said third apparatus from said second apparatus, an updated value data for said configuration parameter data user interface of said first apparatus and/or an updated configuration parameter setting; and cause forwarding by said third apparatus to said first apparatus and to said second apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

19. A user apparatus comprising at least one processor, and at least one memory including computer program code, wherein the at least one memory and the computer program code are configured to, with the at least one processor, cause the user apparatus at least to:

start in the user apparatus a remote support tool application, said user apparatus having a connection with an at least one electric drive apparatus in a local site;

forward, by the user apparatus an indication of a configuration parameter data user interface of said user apparatus to a third apparatus in a remote site; and receive, by the user apparatus from said third apparatus at least one tagged version of a screen of the configuration parameter data user interface of said user apparatus, the at least one tagged version of the screen including a page tag and parameter values.

20. The user apparatus of claim 19, wherein the at least one memory and the program code are configured to, with the at least one processor, further cause the user apparatus at least to:

download, by said user apparatus a configuration parameter setting from said at least one electric drive apparatus in a local site;

forward, by said user apparatus to said third apparatus a calculated value data for said configuration parameter data user interface of said user apparatus and/or said configuration parameter setting downloaded from said at least one electric drive apparatus; and receive, by said user apparatus from said third apparatus at least one tagged version of a screen of the configuration parameter data user interface of said user apparatus, said at least one tagged version of a screen of the configuration parameter data user interface of said user apparatus comprising said calculated value data and/or said configuration parameter setting.

21. The user apparatus of claim 19, wherein the at least one memory and the computer program code are configured to, with the at least one processor, further cause the user apparatus at least to:

update, by said user apparatus a configuration parameter setting of said at least one electric drive apparatus in a local site;

forward, by said user apparatus to said third apparatus an updated value data for said configuration parameter data user interface of said user apparatus and/or an updated configuration parameter setting; and receive, by said user apparatus from said third apparatus at least one tagged version of a screen of the configuration parameter data user interface of said user apparatus, said at least one tagged version of a screen of the configuration parameter data user interface of said user apparatus comprising said updated value data and/or said updated configuration parameter setting.

22. A server apparatus, the server apparatus comprising at least one processor, and at least one memory including computer program code, wherein the at least one memory and the computer program code are configured to, with the at least one processor, cause the server apparatus at least to:

receive in the server apparatus from a first apparatus, said first apparatus having a connection with an at least one electric drive apparatus in a local site, an indication of a configuration parameter data user interface of said first apparatus to said server apparatus; and forward by the server apparatus to said first apparatus and to a second apparatus in a remote support site a tagged version of a screen of the configuration parameter data user interface of said first apparatus, the tagged version of the screen including a page tag and parameter values.

23. The server apparatus of claim 22, wherein the at least one memory and the computer program code are configured to, with the at least one processor, further cause the server apparatus at least to:

receive in the server apparatus from said first apparatus, a calculated value data for said configuration parameter data user interface of said first apparatus and/or said configuration parameter setting downloaded from said at least one electric drive apparatus; and forward by the server apparatus to said first apparatus and to a second apparatus at least one tagged version of a screen of the configuration parameter data user interface of said first apparatus, said at least one tagged version of a screen of the configuration parameter data user interface of said first apparatus comprising said calculated value data and/or said configuration parameter setting.

24. The server apparatus of claim 22, wherein the at least one memory and the computer program code are configured to, with the at least one processor, further cause the server apparatus at least to:

receive in the server apparatus from said first apparatus, an updated value data for said configuration parameter data user interface of said first apparatus and/or an updated configuration parameter setting; and forward by the server apparatus to said first apparatus and to said second apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

25. The server apparatus of claim 22, wherein the at least one memory and the computer program code are configured to, with the at least one processor, further cause the server apparatus at least to:

receive in the server apparatus from said second apparatus, an updated value data for said configuration parameter data user interface of said first apparatus and/or an updated configuration parameter setting; and forward by the server apparatus to said first apparatus and to said second apparatus at least one tagged version of a screen of the configuration parameter data user interface of said first apparatus, said at least one tagged version of a screen of the configuration parameter data user interface of said first apparatus comprising said updated value data and/or said updated configuration parameter setting.

26. A system comprising at least:

one or more sites, a site comprising with an at least one electric drive apparatus in a site that comprise one or more wireless interfaces to enable local connections;

at least one server apparatus being configured to receive in the server apparatus from a user apparatus, an indication of a configuration parameter data user interface of said user apparatus to said server apparatus, and to forward by the server apparatus to said user apparatus and to a service desk apparatus in a remote support site at least one tagged version of a screen of the configuration parameter data user interface of said user apparatus; and a user apparatus having a connection with an at least one electric drive apparatus in a local site and being configured to forward an indication of a configuration parameter data user interface of said user apparatus to a server apparatus; and to receive from said server apparatus at least one tagged version of a screen of the configuration parameter data user interface of said user apparatus, said at least one tagged version of a screen of the configuration parameter data user interface of said user apparatus comprising a page tag and parameter values including said updated value data and/or an updated configuration parameter setting; and at least one service desk apparatus being configured to receive from said server apparatus at least one tagged version of a screen of the configuration parameter data user interface of said user apparatus, to acquiring control by the service desk apparatus from said user apparatus, and to forward by said service desk apparatus to said server apparatus an updated value data for a configuration parameter data user interface of said user apparatus and/or said updated configuration parameter setting; and to receive by said service desk apparatus from said server apparatus at least one tagged version of a screen of the configuration parameter data user interface of said user apparatus, said at least one tagged version of a screen of the configuration parameter data user interface of said user apparatus comprising said updated value data and/or said updated configuration parameter setting.

* * * * *